US010412800B1

(12) United States Patent
Beattie

(10) Patent No.: US 10,412,800 B1
(45) Date of Patent: Sep. 10, 2019

(54) VEHICLE LED DISPLAY SYSTEM

(71) Applicant: Christopher S. Beattie, Belton, MO (US)

(72) Inventor: Christopher S. Beattie, Belton, MO (US)

( * ) Notice: Subject to any disclaimer, the term of this patent is extended or adjusted under 35 U.S.C. 154(b) by 56 days.

(21) Appl. No.: 15/481,175

(22) Filed: Apr. 6, 2017

Related U.S. Application Data

(60) Provisional application No. 62/319,634, filed on Apr. 7, 2016.

(51) Int. Cl.
| | |
|---|---|
| *H05B 33/08* | (2006.01) |
| *H04L 29/08* | (2006.01) |
| *G09F 21/04* | (2006.01) |
| *H05B 37/02* | (2006.01) |
| *G09G 5/00* | (2006.01) |
| *G09G 5/32* | (2006.01) |
| *G06Q 30/02* | (2012.01) |

(52) U.S. Cl.
CPC ..... *H05B 33/0842* (2013.01); *G06Q 30/0265* (2013.01); *G09F 21/04* (2013.01); *G09G 5/003* (2013.01); *G09G 5/32* (2013.01); *H04L 67/125* (2013.01); *H05B 37/0245* (2013.01)

(58) Field of Classification Search
CPC ............ H05B 33/0842; G06Q 30/0265; G09F 21/04; G09F 2021/041; G09F 2013/222
See application file for complete search history.

(56) References Cited

U.S. PATENT DOCUMENTS

| | | | |
|---|---|---|---|
| 5,518,561 A | 5/1996 | Rosa | |
| 6,323,832 B1* | 11/2001 | Nishizawa | G09F 13/22 313/500 |
| 2005/0128757 A1* | 6/2005 | Schneider | B60Q 1/2615 362/398 |
| 2006/0239037 A1* | 10/2006 | Repetto | F21K 9/00 362/555 |
| 2007/0053172 A1 | 3/2007 | Golle et al. | |
| 2007/0062084 A1* | 3/2007 | Rosa | G09F 13/22 40/544 |
| 2007/0097505 A1* | 5/2007 | Desjardin | G09F 21/04 359/515 |
| 2007/0247447 A1* | 10/2007 | Mack | G06Q 30/02 345/204 |

(Continued)

FOREIGN PATENT DOCUMENTS

| | | |
|---|---|---|
| CN | 202419300 U | 9/2012 |
| CN | 104515019 A | 4/2015 |

*Primary Examiner* — Gary C Hoge
(74) *Attorney, Agent, or Firm* — Suiter Swantz pc llo

(57) ABSTRACT

A system for lighted vehicle displays includes a power source, and an LED display assembly. The LED display assembly comprises a transparent flexible substrate reversibly attachable to a surface of a vehicle, and a set of LEDs disposed on a transparent substrate, wherein the one or more LEDs of the set of LEDs are electronically connected to the power source. The LED display assembly further comprising a controller communicatively coupled to the set of LEDs, wherein the controller includes one or more processors configured to execute a set of program instructions stored in memory, wherein the program instructions are configured to cause the one or more processors to control one or more LEDs of the set of LEDs to control output of the set of LEDs.

23 Claims, 10 Drawing Sheets

(56) References Cited

U.S. PATENT DOCUMENTS

| | | | |
|---|---|---|---|
| 2008/0030427 A1* | 2/2008 | Lanham | G06Q 30/02 345/2.3 |
| 2008/0084360 A1* | 4/2008 | Shingai | G09F 9/33 345/1.3 |
| 2009/0019748 A1* | 1/2009 | Rosarius | G09F 21/04 40/591 |
| 2009/0241390 A1* | 10/2009 | Roberts | H05B 37/0254 40/553 |
| 2010/0141418 A1* | 6/2010 | Feroldi | B60Q 1/503 340/449 |
| 2012/0176789 A1* | 7/2012 | Van Herpen | F21V 21/0808 362/234 |
| 2014/0132154 A1* | 5/2014 | Fried | A41D 27/085 315/76 |
| 2014/0267975 A1* | 9/2014 | Ying | G09F 9/33 349/58 |
| 2014/0331532 A1* | 11/2014 | Deppiesse | H05K 1/189 40/541 |
| 2014/0338237 A1* | 11/2014 | Chu | G09F 9/30 40/452 |
| 2015/0043231 A1* | 2/2015 | Clark | G09F 21/048 362/485 |
| 2015/0269621 A1* | 9/2015 | Wilson | G06F 3/14 705/14.62 |
| 2016/0013376 A1* | 1/2016 | Maki | H01L 25/0753 257/88 |
| 2016/0267539 A1* | 9/2016 | Saah | G06Q 30/0265 |
| 2016/0379492 A1* | 12/2016 | Roy | G08G 1/09 340/907 |
| 2018/0276903 A1* | 9/2018 | Rai | G01C 21/3697 |

* cited by examiner

VEHICLE LED DISPLAY SYSTEM

CROSS-REFERENCE TO RELATED APPLICATION

The present application claims priority under 35 USC § 119(e) to U.S. Provisional Patent Application Ser. No. 62/319,634 entitled VEHICLE LED DISPLAY SYSTEM, filed Apr. 7, 2016, naming Christopher S. Beattie as inventor, which is incorporated herein by reference in the entirety.

TECHNICAL FIELD

The present invention generally relates to light-emitting diode (LED) technology, and more particularly, to a system for an LED display assembly on the surface of vehicles.

BACKGROUND

Commercial vehicles (semi-trucks, vans, taxis, buses, delivery vehicles, planes, trains, and the like) are well-known for having company logos and other advertising on the exterior of the vehicle (i.e. "signage" or "markings"). The signage is often a source of information for the commercial vehicles, including company services provided and vehicle identification information.

Methods of marking vehicles currently known in the art have two issues. First, the signage is not easily readable at night time without a source of external light such as a flashlight, headlamps, or street lamps. Additionally, signage applied with traditional methods currently known in the art may also wear out over time, making the signage difficult to read. Second, the signage is painted, printed on a custom magnet, or attached by an adhesive in the form of a sticker or a vinyl wrap. These are all somewhat permanent options, meaning the signage on the truck cannot be altered without time, effort, and money. This is particularly problematic when one desires to repurpose or re-sell the commercial vehicle, or when markings are only temporarily needed. Therefore, it is desirable to create a signage assembly on vehicles that cures the shortcomings of the prior approach.

SUMMARY

A system for lighted vehicle displays is disclosed, in accordance with one or more illustrative embodiments of the present disclosure. In one embodiment, the system includes an LED display assembly comprising a transparent flexible substrate reversibly attachable to the surface of a vehicle. In another embodiment, the LED display assembly comprises a set of LEDs disposed on the substrate. In another embodiment, one or more LEDs of the set of LEDs are electronically connected to the power source. In another embodiment, the LED display assembly comprises a controller communicatively coupled to the set of LEDs. In another embodiment, the controller includes one or more processors configured to execute a set of program instructions stored in memory. In another embodiment, the program instructions are configured to cause the one or more processors to control one or more LEDs of the set of LEDs to control output of the set of LEDs.

A system for lighted vehicle displays is disclosed, in accordance with one or more illustrative embodiments of the present disclosure. In one embodiment, the system includes an LED display assembly comprising a transparent flexible substrate reversibly attachable to the surface of a vehicle. In another embodiment, the LED display assembly includes a set of LEDs disposed on the substrate. In another embodiment, one or more LEDs of the set of LEDs are electronically connected to the power source. In another embodiment, the LED display assembly includes a controller communicatively coupled to the set of LEDs. In another embodiment, the controller includes one or more processors configures to execute a set of program instructions stored in memory. In another embodiment, the program instruction are configured to cause the one or more processors to control one or more LEDs of the set of LEDs to control output of the set of LEDs. In another embodiment, the LED display assembly comprises a portable communication device communicatively coupled to the controller. In another embodiment, the portable communication device includes a user interface.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Embodiments of the present disclosure are directed to a light-emitting diode (LED) display assembly system configured to present company logos, signage and information on vehicles. In some embodiments, the reversible light-emitting diode display assembly is configured with removable LEDs mounted in a substrate displayed on the sides and/or rear facing portion of the vehicle. In some embodiments, the light-emitting diode display includes a power source (e.g. power adapter, battery), user interface (e.g. keyboard, keypad), and controller (e.g. CPU, microcontroller), wherein the controller includes one or more processors, memory and either a wireline or wireless communication connection to the LED display assembly. In some embodiments, a server receives and/or retrieves information from controllers and/or the Internet as well as transmits information to be displayed by the LED display assembly.

FIGS. 1A-3 generally illustrate the use of a light-emitting diode (LED) display assembly on a vehicle, in accordance with one or more embodiments of the present disclosure.

Figure 1A:
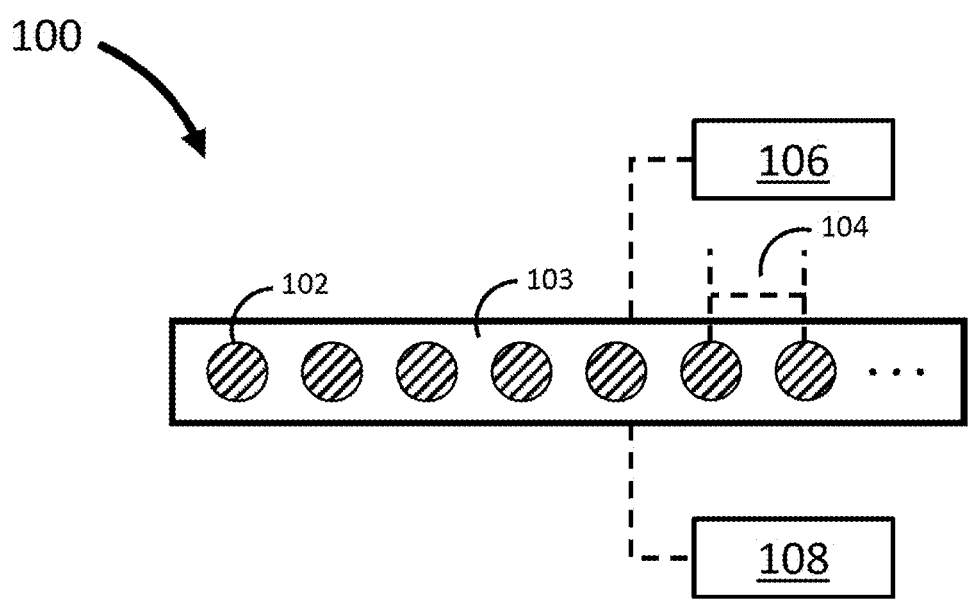
FIG. 1A illustrates an LED display assembly, in accordance with one or more embodiments of the present disclosure.

Referring now to FIG. 1A, an LED display assembly 100 is described, in accordance with one or more embodiments of the present disclosure. In one embodiment, the LED display assembly 100 includes a set of LEDs 102 disposed on a substrate 103. For example, the set of LEDs 102 may include one or more LEDs.

In one embodiment, the LED display assembly 100 includes a substrate 103. In another embodiment, the substrate 103 is substantially transparent. In another embodiment, a substantially transparent substrate configured with an LED display assembly 100 is placed over existing reflective tape and/or signage. It is noted herein, that a substantially transparent substrate allows for proper and potentially easier substrate alignment over the existing reflective tape and/or signage. In another embodiment, the substrate 103 may be substantially opaque.

In one embodiment, the LED display assembly 100 is substantially flexible. For example, a flexible LED display assembly 100 may be implemented to trace and/or outline existing signage on a vehicle 121. In another embodiment, the LED display assembly 100 is substantially rigid.

In one embodiment, the substrate 103 may be reversibly attachable to both the surface of the vehicle and the set of LEDs 102. In this regard, both surfaces of the substrate 103 may be used to couple the surface of the vehicle and the surface of the set of LEDs 102. Furthermore, the substrate 103 may be removable from the surface of the vehicle as well as from the surface of the set of LEDs 102.

In one embodiment, the LED display assembly 100 includes a 1×n strip of the set of LEDs 102 with n-spacing 104. It is contemplated that, while n-spacing 104 is generally illustrated as being equivalent between each adjacent pair of LEDs 102 in the LED display assembly 100, at least one n-spacing 104 may differ from other n-spacing 104 when comparing the values for the adjacent pairs of LEDs 102. For example, the one or more LEDs 102 of the set of LEDs may be evenly spaced. By way of another example, the one or more LEDs 102 of the set of LEDs may be unevenly spaced.

In one embodiment, the LED display assembly 100 is coupled to a power source 106. For example, the power source 106 may be a battery or other energy storage device built into the LED display assembly 100. By way of another example, the power source 106 may be an external component of a vehicle. In another embodiment, the LED display assembly 100 is communicatively coupled to an external controller 108.

Figure 1B:
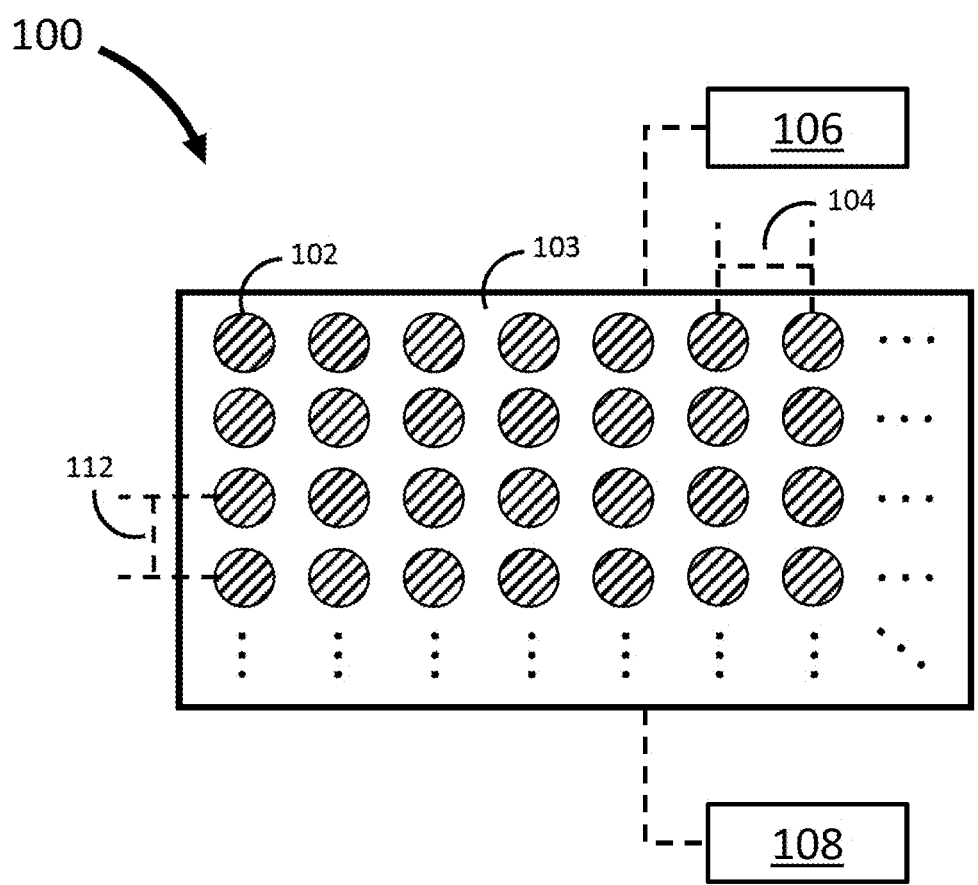
FIG. 1B illustrates an LED display assembly, in accordance with one or more embodiments of the present disclosure.

Referring now to FIG. 1B, an LED display assembly 100 is described, in accordance with one or more embodiments of the present disclosure. It is noted herein that the various embodiments, components and architecture described previously herein should be interpreted to extend to the system 100 of FIG. 1B. In one embodiment, the LED display assembly 100 includes one or more LEDs of the set of LEDs 102 disposed on a substrate 103. In another embodiment, the LED display assembly 100 includes an m×n grid of the set of LEDs 102, with m-spacing 112 and n-spacing 104, covering a percentage ranging from 0.1-100% of a vehicle. In another embodiment, the values m and n may be different or identical numbers. For example, the one or more sets of LEDs 102 may be evenly spaced and/or unevenly spaced. For instance, the one or more sets of LEDs 102 in one direction (e.g., m-spacing 112) may be spaced evenly, while the one or more sets of LEDs 102 in another direction (e.g., n-spacing 104) may be spaced unevenly. In one embodiment, at least one m-spacing 112 and n-spacing 104 differ from other m-spacing 112 and n-spacing 104, respectively, when comparing the values for adjacent pairs of LEDs 102.

Figure 1C:
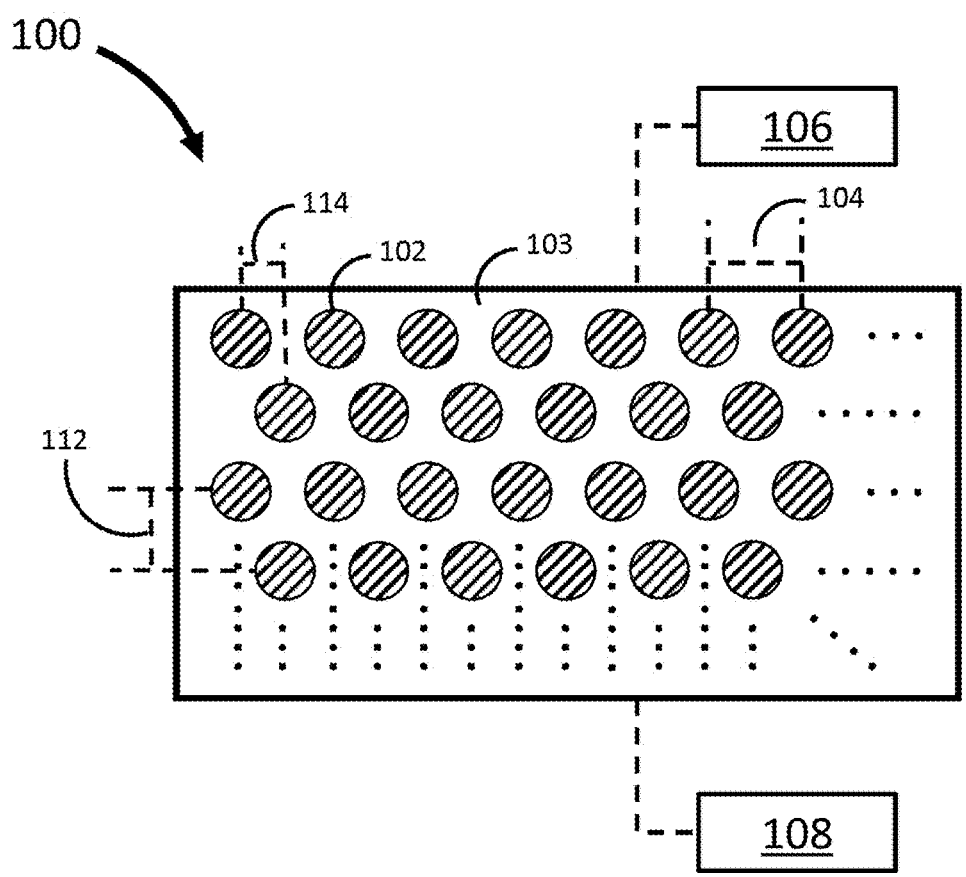
FIG. 1C illustrates an LED display assembly system, in accordance with one or more embodiments of the present disclosure.

Referring now to FIG. 1C, an LED display assembly 100 is described, in accordance with one or more embodiments of the present disclosure. It is noted herein that the various embodiments, components and architecture described previously herein should be interpreted to extend to the system 100 of FIG. 1C. In one embodiment, the LED display assembly 100 includes an m×n grid of the set of LEDs 102, with m-spacing 112 and n-spacing 104. In one embodiment, alternating rows of the set of LEDs 102 are displaced by an offset 114. For example, the one or more sets of LEDs 102 may be evenly spaced in each row while being displaced in every other row by an offset 114. For instance, a set of LEDs 102 in one direction (e.g., n-spacing 104) may be evenly spaced, while the set of LEDs 102 in adjacent rows in the same direction (e.g., n-spacing 104) may be evenly spaced and have an offset 114 in the placement of the first LED in the set of LEDs 102. By way of another instance, the one or more sets of LEDs 102 may form a triangular tiling pattern wherein each LED is surrounded by 6 other LEDs at approximately 60 degree angles from one another.

Figure 1D:
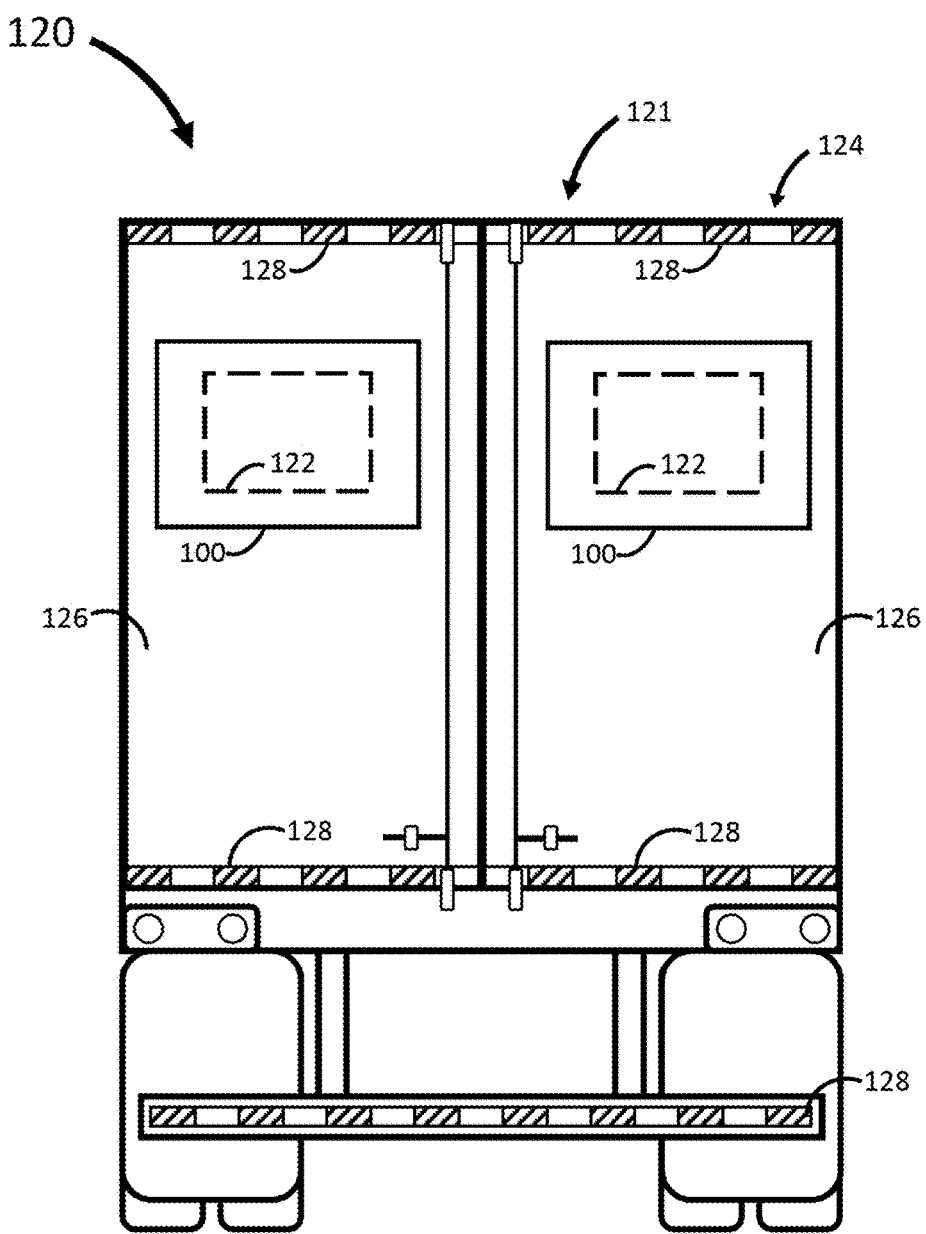
FIG. 1D illustrates an LED display assembly system, in accordance with one or more embodiments of the present disclosure.
Figure 1E:
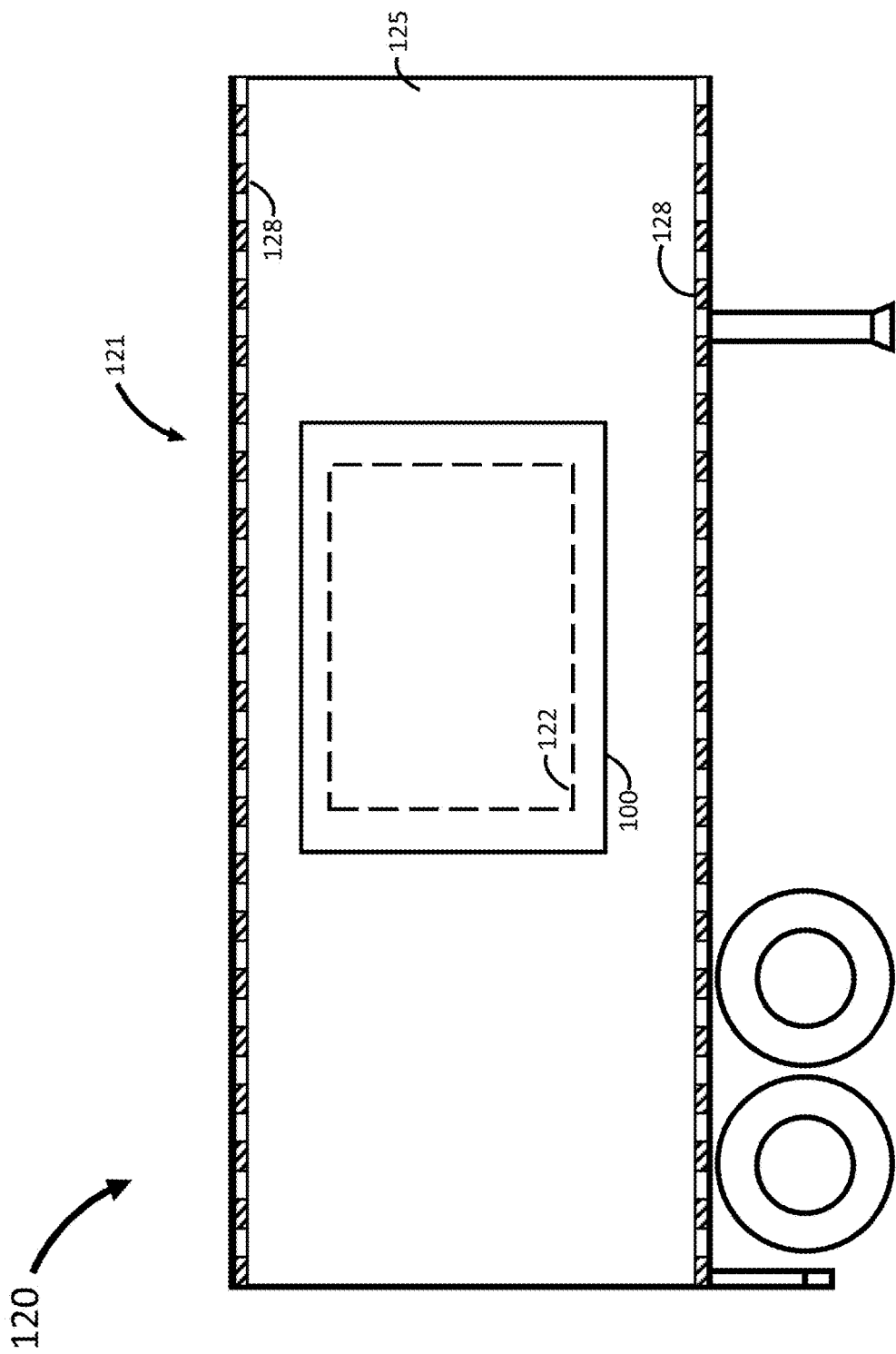
FIG. 1E illustrates an LED display assembly system, in accordance with one or more embodiments of the present disclosure.

Referring now to FIGS. 1D and 1E, an LED display assembly system 120 is described, in accordance with one or more embodiments of the present disclosure. It is noted herein that the various embodiments, components and architecture described previously herein should be interpreted to extend to the system 120 of FIGS. 1D and 1E. It is further noted that the LED display assembly 100 on the rear face 124 of the vehicle 121 and the LED display assembly 100 on the side face(s) 125 of the vehicle 121, should both be implemented by system 120, may display different or identical information.

In one embodiment, the system 120 includes a vehicle 121. For example, the vehicle 121 may be a semi-truck and trailer, wherein the trailer has a rear face 124 and side face(s) 125. In another embodiment, reflective tape 128 is adhered to vehicle 121.

In one embodiment, the LED display assembly 100 is configured to be disposed on the rear doors 126 on the rear face 124 of a vehicle 121. For example, the LED display assembly 100 may be disposed on the rear doors 126 with magnets. By way of yet another example, the LED display assembly 100 may be disposed on the rear doors 126 via dedicated coupling mechanisms on the rear doors 126. It is noted herein that the LED display assembly 100 may be disposed on the rear doors 126 with any adhesive or fastener known in the art. It is also noted herein that the rear doors 126 may include at least one swinging door, a roll-up door, or any type of trailer door known in the art. In another embodiment, the LED display assembly 100 is configured to be disposed directly on the rear face 124 when the rear face 124 has no rear doors 126.

In one embodiment, the LED display assembly 100 is configured to be disposed on the side face(s) 125 of the vehicle 121. For example, the LED display assembly 100 may be disposed on the side face(s) 125 of the vehicle 121 with magnets. By way of yet another example, the LED display assembly 100 may be disposed on the side face(s) 125 of the vehicle 121 via dedicated coupling mechanisms. It is noted herein that the LED display assembly 100 may be disposed on the side face(s) 125 of the vehicle 121 with any adhesive or fastener currently known in the art.

In one embodiment where the substrate of the LED display assembly 100 is substantially transparent, the LED display assembly 100 is disposed on at least one of the rear face 124 or side face(s) 125 over existing signage 122. In this regard, the LEDs 102 of the display assembly 100 may be colored to mimic the existing signage 122 when the LEDs 102 are not lit. In another embodiment where the substrate of the LED display assembly 100 is substantially transparent, the LEDs of the LED display assembly 100 may be lit to mimic the existing signage 122. Additionally and/or alternatively, the LEDs of the LED display assembly 100 may be lit to display multiple types of information so as to integrate with the existing signage 122 of the vehicle 121.

In one embodiment where the substrate of the LED display assembly 100 is substantially transparent, the LED display assembly 100 is disposed on at least one of the rear face 124 and side face(s) 125 over existing reflective tape 128. In this regard, the LEDs of the LED display assembly 100 may be lit to match the color of the corresponding bands of reflective tape 128.

In one embodiment where the substrate of the LED display assembly 100 is substantially opaque, the substrate of the LED display assembly 100 is colored. In another embodiment, the LEDs of the LED display assembly 100 are lit to match the color of the colored substrate. It is noted herein that lit LEDs matching the color of a substrate would allow the same information to be displayed during the day and at night. In another embodiment, the LEDs of the LED display assembly 100 are lit differently from the color of the colored substrate. For example, the colored substrate may act only as a background for the LEDs in the LED display assembly 100. By way of another example, the different colors of substrate and LEDs may allow different information to be displayed during the day versus at night.

In one embodiment, the LED display assembly 100 is combinable to create a single image on at least one of the rear face 124 or the side face(s) 125 of the vehicle 121. For example, two or more LED display assemblies 100 may be disposed next to one another to form one logo or signage. In another embodiment, at least one LED display assembly 100 displays information. For example, the information displayed may include, but is not limited to, any of letters, numbers, or symbols. In another embodiment, the LED display assembly 100 is configured to display multiple types of information. For example, the information may include company signage that includes, but is not limited to, company contact information, driver contact information, driver identification information or vehicle identification information for the vehicle 121. By way of another example, the information may be third-party information including, but not limited to, road conditions, traffic conditions, weather conditions, advertising, AMBER alerts, public safety announcements, and emergency broadcasts.

In one embodiment, the LED display assembly 100 is communicatively coupled to the vehicle 121. For example, the LED display assembly 100 may indicate a change in the operation of the vehicle 121 including, but not limited to, starting, completing a turn, backing up, or hazards if the vehicle 121 starts to experience operational difficulties. By way of another example, the LED display assembly 100 may indicate a change in the service status of the vehicle 121 including, but not limited to, on duty, off duty, returning to dispatch, on assignment, service help needed, or in transit. It is recognized that the vehicle 121 may be any of a van, taxi, plane, train, or any other commercial or non-commercial vehicle known in the art. It is further contemplated that the system and method of displaying information in the present disclosure may be embodied in any stationary or mobile object without departing from the spirit and scope of the present disclosure.

In one embodiment, the information displayed by the at least one LED display assembly 100 is static. In another embodiment, the information displayed by the at least one LED display assembly 100 is dynamic. For example, motion in/out of frame may be added to the information displayed. By way of another example, the information may scroll or flash on the at least one LED display assembly 100. For instance, information may scroll from one side of the LED display assembly 100 to the opposite side.

In one embodiment, the at least one LED display assembly 100 located on each of the side faces 125 and rear face 124 of a vehicle 121 may present a dynamic message that scrolls around the vehicle 121. For example, an image or message may scroll on an LED display assembly 100 disposed on the driver side portion of the vehicle 121, then scroll on an LED display assembly 100 disposed on the rear portion 124 of the vehicle 121 and then scroll on an LED display assembly 100 disposed on the passenger side portion of the vehicle 121. In another embodiment, a message or image will continuously scroll around a vehicle 121 by scrolling from one LED display assembly 100 to another LED display assembly 100 disposed on the side(s) 125 and rear face 124 of the vehicle 121. In this regard, as the text or image scrolls off one LED display assembly 100 the text or image begins to scroll on an adjacent LED display assembly 100 disposed on the vehicle 121. In another embodiment, the text or images that scroll around a vehicle 121 may circle the vehicle 121 in a clockwise or counter-clockwise manner when viewed from above.

Figure 2A:
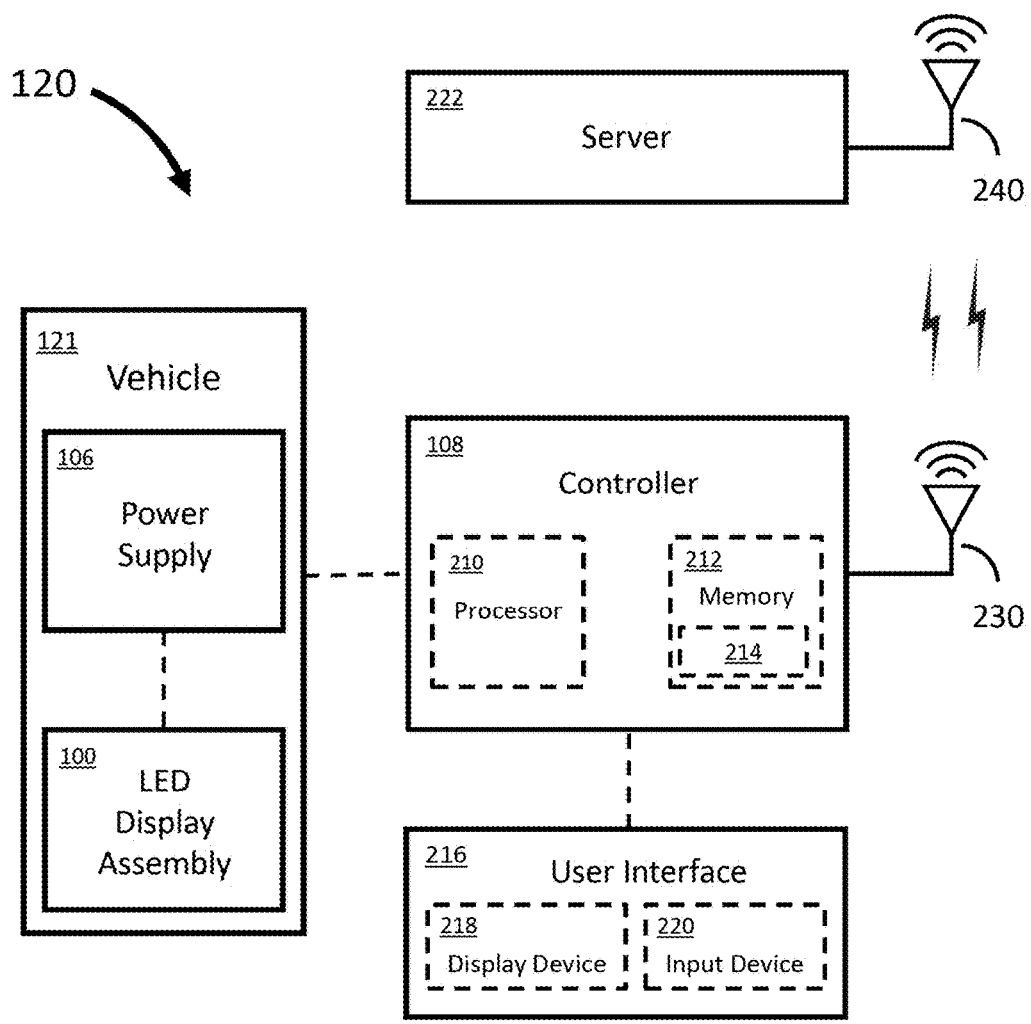
FIG. 2A illustrates a simplified schematic view of an LED display assembly system, in accordance with one or more embodiments of the present disclosure.

Referring now to FIG. 2A, a simplified schematic view of an LED display assembly system 120 is described, in accordance with one or more embodiments of the present disclosure. It is noted herein that the various embodiments, components and architecture described previously herein should be interpreted to extend to the system 120 of FIG. 2A.

In one embodiment, the system 120 is configured to operate an LED display assembly 100 on a vehicle 121. For example, the LED display assembly 100 may be configured on a vehicle 121 including, but not limited to, a semi-truck and trailer, a van, a shuttle, a bus, a taxi, a plane, or a train. It is noted herein that the system 120 could be configured to operate on any commercial or non-commercial vehicle known in the art. It is further noted that the present disclosure may be implemented on any stationary or movable platform.

In one embodiment, the system 120 includes a controller 108. In another embodiment, the controller 108 is communicatively coupled to at least one LED display assembly 100. For example, the controller 108 and the set of LEDs 102 in the LED display assembly 100 may be communicatively coupled via wireline data communication. By way of another example, the controller 108 and the set of LEDs 102 in the LED display assembly 100 may be communicatively coupled via wireless data communication. For instance, the controller 108 and the set of LEDs 102 in the LED display assembly 100 may be communicatively coupled via a wireless data communication connection including, but is not limited to, a Wi-Fi connection, a Bluetooth connection, a cellular data service connection, or a mobile satellite communications connection.

In one embodiment, the controller 108 includes one or more processors 210 communicatively coupled to the LED display assembly 100 and memory 212. In another embodiment, the one or more processors 210 are configured to execute a set of program instructions 214 maintained in memory 212.

In one embodiment, the system 120 includes a user interface 216. In another embodiment, the user interface 216 is communicatively coupled to the one or more processors 210 of the controller 108. For example, the user interface 216 may communicate with the one or more processors 210 of the controller 108 by a wireline connection. By way of another example, the user interface 216 may communicate with the one or more processors 210 of the controller 108 by wireless connection. For instance the user interface 216 may communicate with the one or more processors 210 of the controller by any of, but is not limited to, a Wi-Fi connection, a cellular connection, a satellite connection, a radio wave signal, or an internet-based computing connection.

In another embodiment, the controller 108 and the user interface 216 may be embodied in a portable device such as, but not limited to, a smartphone, tablet, phablet, laptop, ultrabook or customized portable device, which may execute a set of program instructions 214 stored in the memory medium 212 with one or more processors 210.

In another embodiment, the controller 108 of the system 200 is configured to receive and/or acquire data or information from other systems or sub-systems (e.g., at least one LED display assembly 100 or user interface 216) by a transmission medium that may include wireline and/or wireless portions. In another embodiment, the controller 108 of the system 120 is configured to transmit data or information (e.g., the output of one or more processes disclosed herein) to one or more systems or sub-systems (e.g., at least one LED display assembly 100 or user interface 216) by a transmission medium that may include wireline and/or wireless portions. In this manner, the transmission medium may serve as a data link between the controller 108 and other subsystems of the system 120. Moreover, the controller 108 may send data to external systems via a transmission medium (e.g., network connection).

In one embodiment, the controller 108 collects information from a server 222 via a communicatively coupled wireless connection 230. In another embodiment, the server 222 is wirelessly connected to the controller 108 via a communicatively coupled wireless connection 240. In another embodiment, the controller 108 and server 222 may communicate by any of, but is not limited to, a Wi-Fi connection, a cellular connection, a satellite connection, a radio wave signal, or an internet-based computing connection.

In one embodiment, the server 222 receives information from a controller 108. For example, a controller 108 on a vehicle 121 may receive measurements of the air temperature outside the vehicle 121 and transmit this information to the server 222. In another embodiment, the server 222 is simultaneously communicatively coupled to a plurality of controllers 108 on a plurality of vehicles 121. For example, a server 222 may be communicatively coupled to a fleet of company vehicles 121. By way of another example, a server 222 may be simultaneously communicatively coupled to a plurality of individual or company subscribers.

In one embodiment, the server 222 is accessible via the Internet. In another embodiment, the server 222 includes a database. For example, a database may be maintained on a server accessible via the Internet. In another embodiment, the server includes internet based server storage (e.g., cloud storage). In another embodiment, the controller 108 retrieves information from Internet websites for posting on an LED display assembly 100. For example, information about road conditions may be retrieved from a state department of transportation website. By way of another example, information about the weather may be retrieved from the national weather service website. In another embodiment, the controller 108 retrieves information from Internet websites on a regular basis. For example, the controller 108 may retrieve information from Internet websites every 30 minutes. In another embodiment, the controller 108 displays collected information from Internet websites on at least one LED display assembly 100 in a static or dynamic manner. In another embodiment, a server 222 retrieves information from websites on the Internet and transmits the information to one or more controllers 108 on one or more vehicles 121.

In one embodiment, information displayed by an LED display assembly 100 includes, but is not limited to, a company sign, a company logo, a post of vehicle identification information, a vehicle status posting, an advertisement, a traffic condition alert, a road condition alert, a weather condition alert, an AMBER alert, a public safety announcement, or an emergency broadcast. For example, the LED display assembly 100 may display any of a vehicle destination, a commercial vehicle grouping number, a commercial vehicle terminal, a commercial vehicle runway, or a commercial vehicle railyard marking. By way of another example, the LED display assembly 100 may display any of a severe weather advisory, road closure information, traffic delay information, reduced speed advisories, detour information, law enforcement advisories, or kidnapping alerts.

In one embodiment, the color of the at least one LED display assembly 100 is altered in conjunction with, or independent of, the information displayed. For example, weather information may be displayed as blue text. By way of another example, a user may designate that all information will be displayed as red text. In another embodiment, the color of one or more of the one or more LEDs of the set of LEDs 102 is altered in conjunction with, or independent of, the information displayed. For example, the individual LEDs that form words may randomly change color between green and red during the month of December. In another embodiment, the color of words or the individual LEDs that form words may change color. For example, the color of words or the individual LEDs that form words may all change between two or more colors together. For instance, words shown on the LED display assembly 100 may alternate between the colors of yellow and orange every 10 seconds.

In one embodiment, the one or more processors 210 of a controller 108 includes any one or more processing elements known in the art. In this sense, the one or more processors 210 may include any microprocessor device configured to execute algorithms and/or instructions. For example, the one or more processors 210 may consist of a desktop computer, mainframe computer system, workstation, image computer, parallel processor, handheld computer (e.g., tablet, smartphone, or phablet), or other computer system (e.g., networked computer) configured to execute a program configured to operate the system 120, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions 214 from a non-transitory memory medium (e.g., memory 212). Moreover, different subsystems of the system 120 (e.g., LED display assembly 100 or user interface 216) may include processor or logic elements suitable for carrying out at least a portion of the steps described throughout the present disclosure. Therefore, the above description should not be interpreted as a limitation on the present disclosure but merely an illustration.

It is noted that the memory medium 212 may include any storage medium known in the art suitable for storing program instructions 214 executable by the associated one or more processors 210. For example, the memory medium 212 may include a non-transitory memory medium. For instance, the memory medium 212 may include, but is not limited to, a read-only memory, a random access memory, a serial access memory, a magnetic or optical memory device (e.g., disk), a magnetic tape, a solid state drive and the like. It is noted herein that the memory 212 is configured to provide display information to the at least one LED display assembly 100 and/or the output of the various steps described herein. It is further noted that memory 212 may be housed in a common controller 108 housing with the one or more processors 210. In another embodiment, the memory 212 may be located remotely with respect to the physical location of the processors 210 and the controller 108. For example, the one or more processors 210 of the controller 108 may access a remote memory (e.g., server), accessible through a network (e.g., internet, intranet and the like). In another embodiment, the memory medium 212 stores the program instructions 214 for causing the one or more processors 210 to carry out the various steps described through the present disclosure.

In one embodiment, the system 120 includes a power source 106 coupled to the at least one LED display assembly 100. For example, the power source 106 may be the vehicle 121, wherein the at least one LED display assembly 100 is coupled to the existing electrical system of the vehicle 121 via a dedicated coupling plug. By way of another example, the power source 106 may be a DC motor assembly coupled to an axle of a vehicle 121 containing at least one of a DC motor, a battery, and the electronics necessary to provide power to the at least one LED display assembly 100. In another embodiment, the power source 106 includes an induction (wireless) charging system. For example, a first set of inductive coils (not shown) may be affixed to or embedded in the vehicle 121 and may induce a current in a second set of inductive coils coupled to the at least one LED display assembly 100 to provide power for the LED display assembly 100. For instance, inductive coils may be affixed to or embedded in the surface of a vehicle 121 and induce a current in a second set of inductive coils affixed to or embedded in the substrate 103 of the LED display assembly 100.

In one embodiment, the power source 106 includes solar power technology. For example, the power source 106 may include one or more photovoltaic cells. For instance, the one or more photovoltaic cells may be attached to or embedded in a surface of the vehicle 121 and contain at least one of a solar panel, battery, and the electronics necessary to convert solar radiation to electric voltage or current, which provide power to the at least one LED display assembly 100.

In one embodiment, the power source 106 is a wind power technology. For example, the power source 106 may include a wind powered device. For instance, the wind powered device of the power source 106 may be attached to a surface of the vehicle 121, the power source 106 including at least one of a motor, blade assembly, battery, and electronics necessary to provide power to the at least one LED display assembly 100.

In one embodiment, at least one of the power source 106 and the at least one LED display assembly 100 is permanently attached to the vehicle 121. For example, the at least one LED display assembly 100 may be permanently attached with a dedicated coupling mechanism on the vehicle 121. It is noted herein that the at least one LED display assembly 100 may be permanently attached with any fasteners or adhesives known in the art.

In one embodiment, at least one of the power source 106 and the at least one LED display assembly 100 is removable from the vehicle 121. For example, the at least one LED display assembly 100 may be attached to the vehicle 121 with magnets.

Figure 2B:
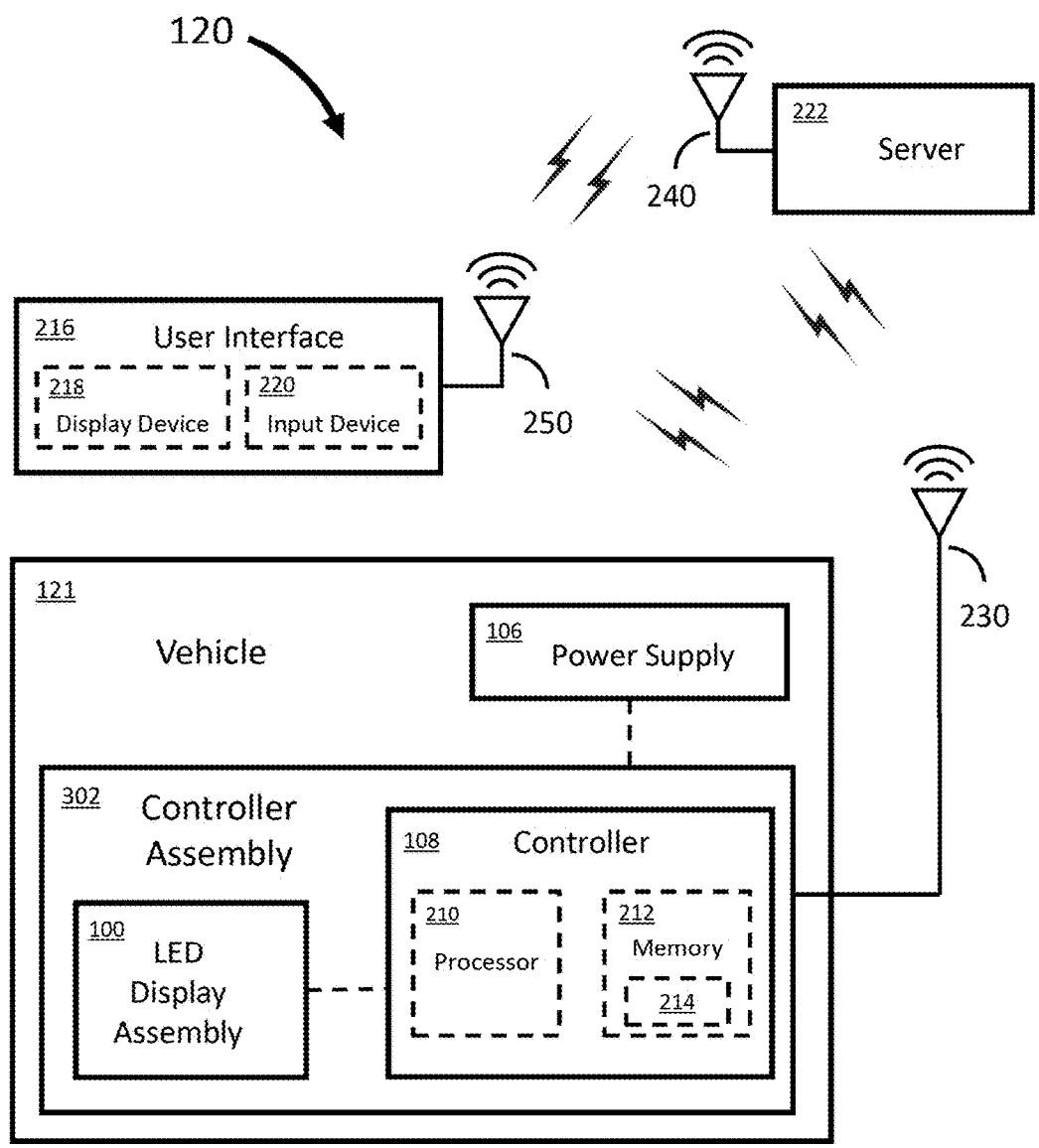
FIG. 2B illustrates a simplified schematic view of an LED display assembly system, in accordance with one or more embodiments of the present disclosure.

Referring now to FIG. 2B, a simplified schematic view of an LED display assembly system 200 is described, in accordance with one or more embodiments of the present disclosure.

In one embodiment, the information displayed on one or more LED display assemblies 100 is modifiable by a user via at least one of a controller 108 and a user interface 216. It is noted that this allows for easy control of information displayed on the LED display assembly 100 by the user through the input device 220.

In one embodiment, the controller 108 and LED display assembly 100 are combined into a single controller assembly 302. For example, the controller 108 and LED display assembly 100 may be contained on a single panel or device. In one embodiment, the user interface 216 is wirelessly connected to the controller 108 via a communicatively coupled wireless connection 250.

In another embodiment, the controller 108 and user interface 216 may communicate by any of, but not limited to, a Wi-Fi connection, a cellular connection, a satellite connection, a radio wave signal, or an internet-based computing connection.

In one embodiment, the user interface 216 is configured to be utilized by the controller 108 to accept selections and/or instructions from a user. In one embodiment, the user interface 216 includes a user input device 220 configured to accept a set of messages from a user and a display device 218 configured to display the set of messages acquired by the user input device 220.

In one embodiment, the user interface 216 is a portable communication device communicatively coupled to the controller 108. For example, the user interface 216 may be a mobile phone configured with a Wi-Fi connection. In another embodiment, the user interface 216 is mounted in the vehicle 121. For example, a user interface 216 may be a dedicated device mounted in the cab of a trailer truck and communicatively coupled to an LED display assembly 100 by either a wireline or wireless connection. It is noted herein that the user interface 216 may include any user interface known in the art. It is further noted herein that the input device 220 may include any user input device known in the art. For example, the user input device 220 of the user interface 216 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present disclosure. For instance, the display device 218 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure.

The display device 218 may include any display device known in the art. In one embodiment, the display device 218 includes, but is not limited to, a liquid crystal display (LCD). In another embodiment, the display device 218 includes, but is not limited to, an organic light-emitting diode (OLED) based display. In another embodiment, the display device 218 includes, but is not limited to a cathode ray tube (CRT) display. Those skilled in the art should recognize that a variety of display devices may be suitable for implementation in the present disclosure and the particular choice of display may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present disclosure.

Figure 3:
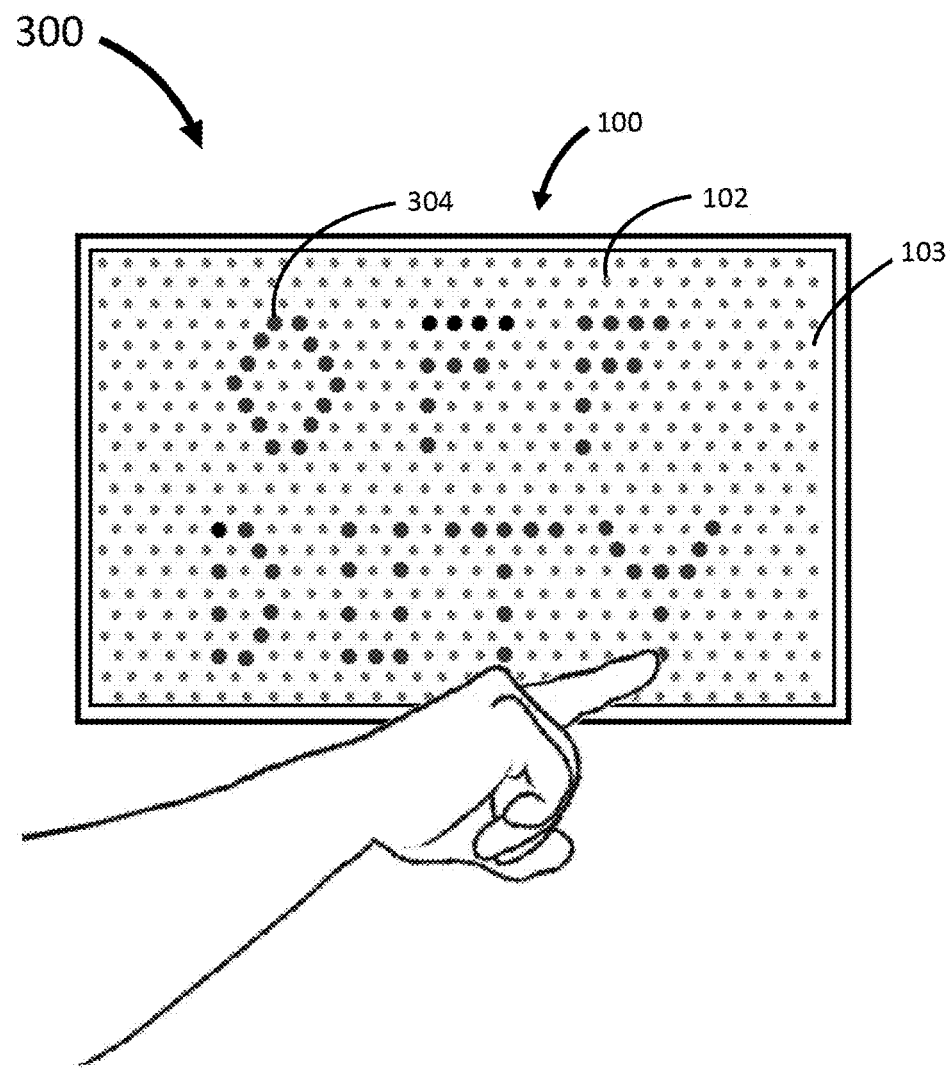
FIG. 3 illustrates a simplified input device interface of an LED display assembly system, in accordance with one or more embodiments of the present disclosure.

Referring now to FIG. 3, a simplified schematic view of a graphical representation 300 of at least one LED display assembly 100 is described, in accordance with one or more embodiments of the present disclosure.

In one embodiment, the set of program instructions 214 cause the processor 210 to provide on the display device 218 of the user interface 216 a graphical representation 300 of the individual LEDs 102 of at least one LED display assembly 100. In this regard, the user input device 220 of the user interface 216 may be a touchscreen or analog pad/button combination on the handheld device, with which the user may select and activate specific LEDs 102 on the at least one LED display assembly 100.

In one embodiment, a user selects individual LEDs 102 of an LED display assembly 100 to be activated. For example, a user may chose individual LEDs 102 of an LED display assembly 100 to become illuminated LEDs 304 to form a message, a word, a symbol, or an image. For instance, a user may select on a user interface 216 individual LEDs 102 of an LED display assembly 100 to become illuminated LEDs 304.

In one embodiment, the controller 108 receives user entered information from an input device 220 via the user interface 216 in the form of letters, numbers, symbols, drawings, or images to be displayed on an LED display assembly 100. For example, a user may utilize the input device 220 to enter and send a series of characters containing letters, numbers and symbols to the controller 108 to be displayed by the LED display assembly 100. By way of another example, a user may utilize the input device 220 to draw, scan, or upload an image to be sent to the controller 108 to be displayed by the display assembly 100.

In one embodiment, the controller 108 prompts a user to submit information to be displayed by the display assembly 100. In another embodiment, the controller 108 sends a request to a user via the display device 218 of the user interface 216 for the user to provide a response through the input device 220. For example, a user may be prompted to upload an image to the controller 108 via the user interface 216 input device 220. In this regard, the controller 108 is able to determine which LEDs 102 on the at least one LED display assembly 100 should be activated based on the uploaded image. In another embodiment, the controller 108 provides the user with the means to alter specific LEDs 102 following the initial determination of the desired image before the LEDs 102 on the LED display assembly 100 are activated. Additionally and/or alternatively, the controller 108 may provide the user with the means to alter specific LEDs 102 following the initial determination of the desired image after the LEDs 102 on the LED display assembly 100 are activated.

Figure 4A:
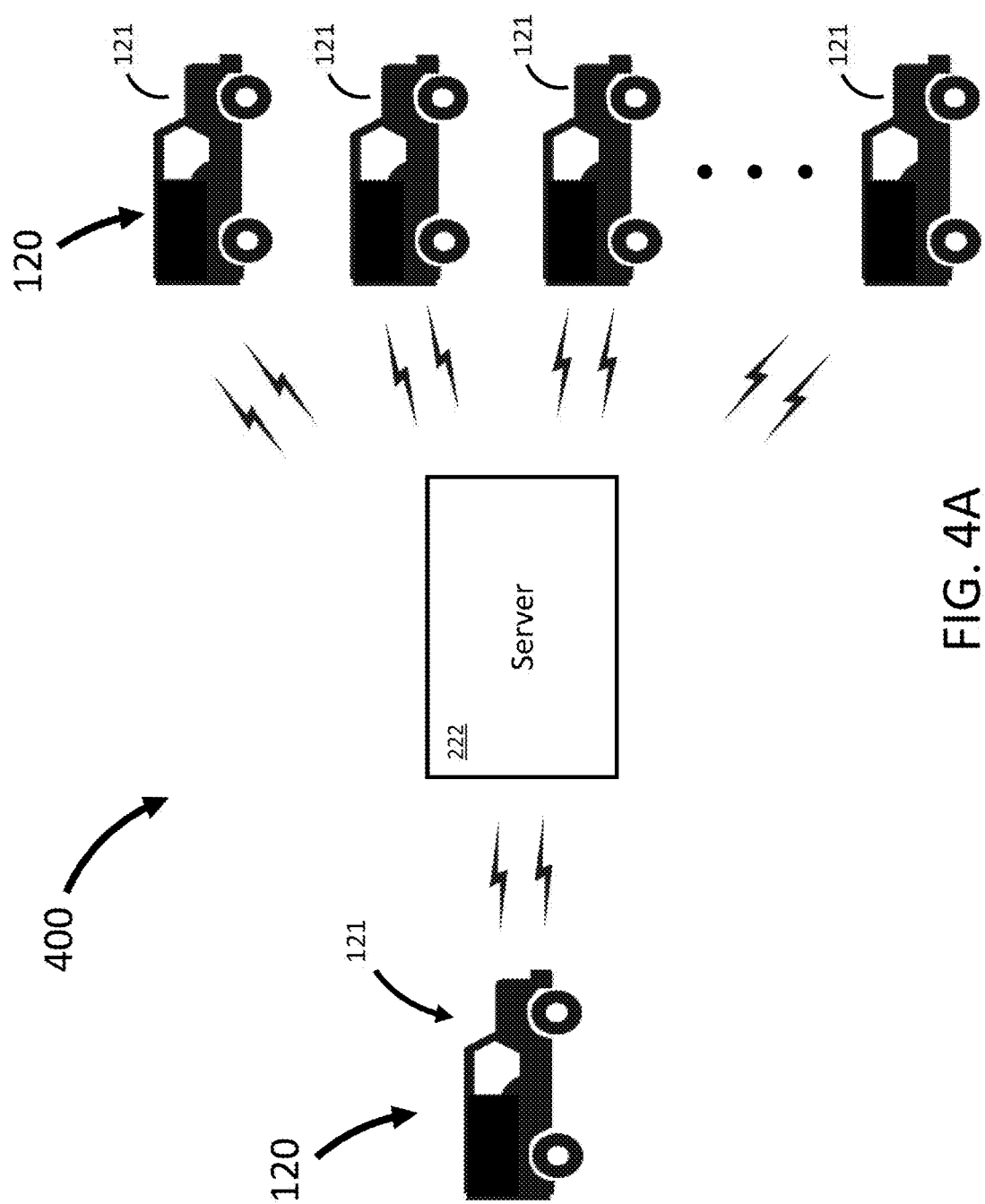
FIG. 4A illustrates a simplified diagram of a messaging system, in accordance with one or more embodiments of the present disclosure.

Referring now to FIG. 4A, a simplified diagram of a messaging system 400 is described, in accordance with one or more embodiments of the present disclosure. In one embodiment, a server 222 is communicatively coupled to a plurality of vehicles 121. In another embodiment, a server 222 may communicate information to a controller 108. For example, a server 222 may transmit traffic information to a vehicle 121. In another embodiment, a server 222 simultaneously transmits information to a plurality of controllers 108 located on a plurality of vehicles 121. For example, a server 222 may transmit a severe weather alert to a fleet of company vehicles. In another embodiment, a controller 108 on a single vehicle 121 transmits information to a server 222 and the server 222 then simultaneously transmits the information to a plurality of controllers 108 on a plurality of vehicles 121. For example, a controller 108 may transmit to a server 222 information about a traffic accident that the server 222 may then transmit to a fleet of company vehicles 121. In another embodiment, any number of controllers 108 may communicate information with a server 222 and the server 222 may then relay the information to any number of controllers 108. In another embodiment, one or more controllers 108 may obtain information from the server 222 including, but is not limited to, a company sign, a company logo, a post of vehicle identification information, a vehicle status posting, an advertisement, a traffic condition alert, a road condition alert, a weather condition alert, an AMBER alert, a public safety announcement, or an emergency broadcast.

Figure 4B:
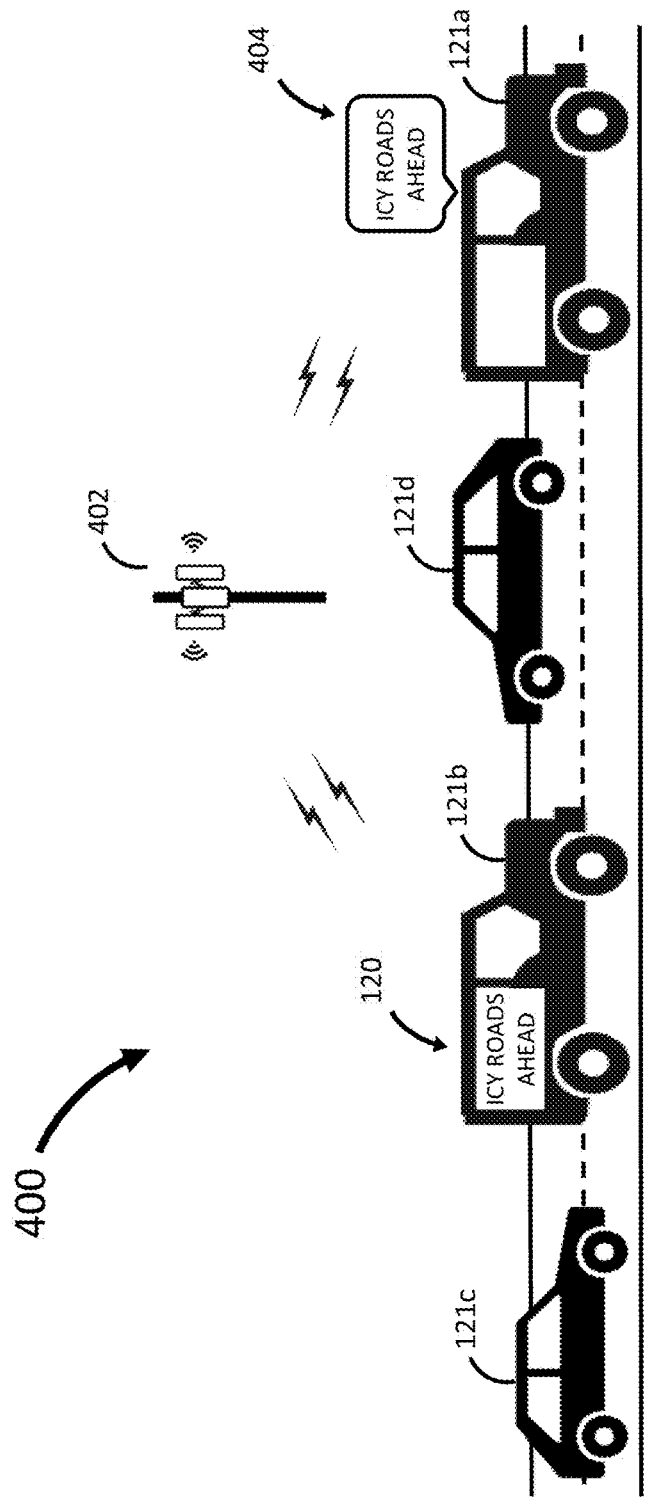
FIG. 4B illustrates a simplified diagram of a messaging system, in accordance with one or more embodiments of the present disclosure.

Referring now to FIG. 4B, a simplified diagram of a messaging system 400 is described, in accordance with one or more embodiments of the present disclosure. In one embodiment, a first vehicle 121a and a second vehicle 121b are communicatively coupled without interaction with the server 222 (not shown). For example, a first vehicle 121a and a second vehicle 121b may be connected by a cellular connection 402.

In one embodiment, a first vehicle 121a communicates a message to a second vehicle 121b for display. For example, a message may be manually entered into a controller 108 on the first vehicle 121a that is communicated to a second vehicle 121b for display on an LED display assembly system 120 of the second vehicle 121b. For instance, a message 404 of "ICY ROADS AHEAD" may be manually entered into a controller 108 on a first vehicle 121a that is then communicated to a second vehicle 121b and displayed on an LED display assembly system 120 of the second vehicle 121b. It is noted herein that a message received by a second vehicle 121b may be displayed on a driver side, a passenger side, a rear, or any combination of sides of the vehicle 121b and is only shown on the passenger side in FIG. 4B for illustrative purposes. In another embodiment, a controller 108 on a first vehicle 121a may automatically send a message to be displayed on a second vehicle 121b. For example, a trigger may automatically initiate a message being sent to one or more vehicles 121 for display. It is noted herein that a trigger that initiates a message automatically being sent to one or more vehicles 121 may include, but is not limited to, a sensed temperature, a sensed wind, a sensed decreased visibility, a sensed reduced traction, a reduced speed, a sudden stop, or a sudden change in velocity. For example, an anti-lock braking system being active may trigger a message 404 being sent from a first vehicle 121a to a second vehicle 121b traveling behind the first vehicle 121a. In another embodiment, an automatically triggered message may be sent for display to vehicles 121 in a certain geographic area. For example, an automatically triggered message regarding road conditions may be sent to vehicles on the same roadway. For instance, an automatically triggered message regarding road conditions may be sent for display on vehicles 121 that are on the same roadway and within a certain distance of the vehicle 121 sending the automatically triggered message.

In another embodiment, a controller 108 is programmable to display automatically triggered messages received once confirmation is given by a user of a vehicle 121 receiving the automatically triggered message. It is noted herein that a messaging system 400 may communicatively couple one or more vehicles 121 by any of, but is not limited to, a Wi-Fi connection, a cellular connection, a satellite connection, a radio wave signal, or an internet-based computing connection.

In another embodiment, a transmitted message 404 sent to a second vehicle 121b may be viewed by another vehicle 121c following the second vehicle 121b. In another embodiment, a transmitted message sent to a second vehicle may be viewed by another vehicle 121d that passes the second vehicle 121b and is going in the opposite direction from the second vehicle 121b.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system comprising:
an LED display assembly, wherein the LED display assembly comprises:
a transparent flexible substrate reversibly attachable to a surface of a first vehicle; and
a set of LEDs disposed on the substrate; and
a controller communicatively coupled to the set of LEDs of the LED display assembly, wherein the controller includes one or more processors configured to execute a set of program instructions stored in memory; and
a user interface, disposed in a cabin of the first vehicle on a communication device, wherein the user interface is configured to display a graphical representation of individual LEDs of the LED display assembly, wherein the user interface is communicatively coupled to the controller of the LED display assembly and further configured to receive a selection from a user of individual LEDs for activation on the LED display assembly, wherein the program instructions of the controller are further configured to cause the one or more processors to control an activation state of one or more LEDs of the set of LEDs in response to one or more signals from the user interface indicative of the selection from the user.

2. The system of claim 1, wherein the controller and the set of LEDs are communicatively coupled via a wireless data communication, wherein the wireless data communication includes at least one of a Wi-Fi connection, a Bluetooth connection, a cellular data service connection, or a mobile satellite communication connection, wherein the controller is further configured to display an output of the set of LEDs based on a signal sent from a second vehicle in response to a trigger event.

3. The system of claim 1, wherein the one or more LEDs of the set of LEDs are electronically connected to a power source.

4. The system of claim 3, wherein the power source includes at least one of a battery, a photovoltaic cell, a wind turbine, or an electrical system of a vehicle.

5. The system of claim 3, wherein the power source includes an inductive coil system affixed to the first vehicle.

6. The system of claim 1, wherein the LED display assembly is magnetically affixed to a vehicle.

7. The system of claim 1, wherein the set of LEDs are removable from the substrate and reinsertable into a side of the substrate.

8. The system of claim 1, wherein one or more LEDs in the LED display assembly are individually selectable for altering the activation of the one or more LEDs in the LED display to modify an image on the LED display assembly.

9. The system of claim 1, wherein the one or more LEDs of the set of LEDs are evenly spaced.

10. The system of claim 1, wherein the one or more LEDs of the set of LEDs are unevenly spaced.

11. A system comprising:
an LED display assembly, wherein the LED display assembly comprises:
a transparent flexible substrate reversibly attachable to a surface of a first vehicle;
a set of LEDs disposed on the substrate;
a controller communicatively coupled to the set of LEDs of the LED display assembly, wherein the controller is separate from a user interface and includes one or more processors configured to execute a set of program instructions stored in memory, wherein the program instructions are configured to cause the one or more processors to control one or more LEDs of the set of LEDs to control output of the set of LEDs, wherein the controller is further configured to display information received in response to a user prompt and information sent from a second vehicle due to a trigger event; and
a portable communication device, disposed in a cabin of the first vehicle, wirelessly communicatively coupled to the controller, wherein the portable communication device includes the user interface, wherein the user interface is configured to display a graphical representation of individual LEDs of the LED display assembly and receive a selection from a user of individual LEDs on the LED display assembly to modify an image on the LED display assembly.

12. The system of claim 11, wherein the controller and the portable communication device are wirelessly communicatively coupled to a server.

13. The system of claim 12, wherein the controller and LED display assembly are configured to display information received from the server including at least one of a company sign, a company logo, a post of vehicle identification information, a vehicle status posting, an advertisement, a traffic condition alert, a road condition alert, a weather condition alert, an AMBER alert, a public safety announcement, or an emergency broadcast.

14. The system of claim 11, wherein the controller and the set of LEDs are communicatively coupled via a wireless data communication, wherein the wireless data communication includes at least one of a Wi-Fi connection, a Bluetooth connection, a cellular data service connection, or a mobile satellite communication connection.

15. The system of claim 11, wherein the one or more LEDs of the set of LEDs displayed on the LED display assembly are controllable by providing a set of instructions to the user interface.

16. The system of claim 11, wherein one or more LEDs in the LED display assembly are individually selectable for altering an activation of the one or more LEDs in the LED display to modify an image on the LED display assembly.

17. The system of claim 11, wherein the one or more LEDs of the set of LEDs are electronically connected to a power source.

18. The system of claim 17, wherein the power source includes at least one of a battery, a photovoltaic cell, or a wind turbine, or an electrical system of a vehicle.

19. The system of claim 17, wherein the power source includes an inductive coil system affixed to the first vehicle.

20. The system of claim 11, wherein the LED display assembly is magnetically affixed to a vehicle.

21. The system of claim 11, wherein the set of LEDs are removable from the substrate and reinsertable into a side of the substrate.

22. The system of claim 11, wherein the one or more LEDs of the set of LEDs are evenly spaced.

23. The system of claim 11, wherein the one or more LEDs of the set of LEDs are unevenly spaced.

* * * * *